3,097,952
PROCESS FOR PURIFYING SALT AND
PRODUCT THEREOF
George E. Bresette, Haverford, Pa., assignor of one-half to Pauline Lobb Parrish, Devon, Pa.
No Drawing. Filed Feb. 9, 1961, Ser. No. 88,010
7 Claims. (Cl. 99—143)

This invention relates to the purification of sodium chloride, usually known as common salt or simply salt, and more particularly to a new and improved method for purifying salt, and to a novel seasoning composition comprising a colloidal suspension of substantially pure salt particles produced by such method.

According to the circumstances, salt is either mined, or extracted from salt beds by solution in water (i.e. in the form of a brine) or obtained from the sea by evaporation. The salt obtained by these methods is contaminated with small quantites of other salts as impurities, typical of which are calcium chloride, magnesium chloride, calcium sulfate, and magnesium sulfate. In preparing salt for use in seasoning food it has been the practice to treat the raw salt to substantially remove, or at least reduce, the amount of magnesium and calcium chlorides present. However, salt commercially available for human consumption still contains measurable amounts of impurities.

Although it is generally believed that salt is a necessary element of the human diet, more recently greater consideration has been given to the effect of ingestion of salt by humans and whether such use may have any adverse effects on the body. Involved in such studies is the part played by salt in water build up.

A principal object of this invention is to provide an improved method for producing substantially pure sodium chloride or common salt particles.

It is also a principal object of this invention to provide a novel seasoning composition comprising a colloidal suspension of substantially pure salt particles.

Another object of the invention is the provision of a novel method for substantially removing impurities from salt particles and rendering the purified salt particles in an extremely fine state of subdivision.

A further object of this invention is to provide substantially pure salt particles having greatly improved hydroscopic properties.

A still further object of this invention is the provision of novel physical method for purifying sodium chloride which overcomes certain disadvantages of chemical purification procedures.

Yet another object of the invention is the provision of a novel liquid condiment comprising an aqueous colloidal suspension of substantially pure salt particles in high concentration.

Still another object of this invention is to provide a relatively simple and economic physical process for treating impure salt particles to effect purificaion and particle size reduction.

A still further object of this invention is to provide a novel liquid seasoning comprising a highly stable colloidal suspension of substantially pure salt particles which is believed to be more beneficial to the human system than presently available salt products.

These and other objects of this invention will become more clearly apparent from a consideration of this specification and appended claims.

According to this invention there is provided a novel method for purifying salt particles which comprises subjecting an aqueous slurry of impure sodium chloride particles to voilent shearing action whereby the sodium chloride particles are substantially freed of associated impurities and are reduced to colloidal size, and removing the separated impurities from the resulting aqueous colloidal suspension of substantially pure salt particles.

The carrying out of the process described in the preceding paragraph advantageously produces a novel liquid seasoning comprising an aqueous colloidal suspension of substantially pure, colloidal size salt crystals of high solids content.

Salt particles, commonly referred to as crystals, including the type used in seasoning foods, comprise clumps of sodium chloride crystals of minute size, generally less than one micron, having bonded thereto or intimately associated therewith impurities, in the form of salts, of substantially larger size. According to this invention it was discovered that when such impure salt particles are suspended in aqueous medium and subjected to violent shearing action, those bonds, believed to be magnetic, which hold the particles together, including associated impurities, are weakened to the extent that the particles disintegrate into substantially pure crystals of less than one micron and at the same time these minute salt crystals are freed of impurities. When the liquid assumes a quiescent condition, as by standing, the impurities, because of their relatively large size, settle out under the force of gravity. The purified salt crystals, because of their extremely small size, essentially colloidal size, remain suspended in the liquid separation medium to form a relatively stable colloidal suspension of relatively high solids content. Removal of the separated impurities can be effected more rapidly by subjecting the liquid separation medium to forces many times gravity, as for example in a centrifuge.

The highly stable colloidal suspension of relatively pure salt crystals produced by the herein described method is particularly useful as a seasoning for foods. Furthermore, applicant believes that the use of such a colloidal suspension, or the salt particles obtainable from such a suspension by evaporation of the liquid medium, is more beneficial to the human system than presently available salt products, and in fact may obviate certain undesirable effects resulting from the ingestion of commercially available salt products.

More particularly, applicant believes that the ingestion of commerically available salt products may, to some degree, contribute to circulatory disorders and water build up. The impurities of such salt products may get into the blood stream and because of their relatively slight solubility therein may cause mechanical stoppage of small blood vessels and capillaries resulting in build up of body fluids. Also, these impurities and relatively large impure salt particles of low blood solubility may tend to promote undesirable deposition of cholesterol on the walls of arteries and blood vessels. Furthermore, the salt particles themselves may be deposited together with cholesterol.

As stated above, the particles of relatively pure salt produced by the method of this invention are of colloidal size. Thus, upon entering the blood stream they are believed to remain in suspension rather than deposit on the walls of arteries and blood vessels; neither do they tend to block small blood vessels and capillaries. Furthermore, it is believed that these minute substantially pure salt particles do not promote coagulation and deposition of cholesterol in the circulatory system.

Although applicant believes that the above statements relating to the effect on the human body of commercially available salt and his novel salt product are correct, he does not wish to be bound thereby.

The dry salt product which may be obtained by applicant's novel process, in addition, has greatly improved hydroscopic properties. Furthermore, it is a relatively bulky product of lower density. Because of the small particle size, and the correspondingly large surface area of the particles, a lesser quantity of this salt product, whether in solid form or in the form of an aqueous colloidal suspension of high solids content, is required to season food than is required with ordinary salt products heretofore available. This ability of the salt product produced by this invention to season properly with reduced amounts of salt may in itself be beneficial to the human system.

The raw material for use in accordance with the process of this invention may be any raw salt produced by such methods as mining, extraction or evaporation of sea water. The salt raw material may also comprise commercially available salt products which have been purified to some degree, including U.S.P. salt. In Table I, below, are the analyses of two typical raw salt materials for treatment according to the method of this invention, one comprising rock salt and the other sea salt crystals.

TABLE I

|  | Percent Solids | |
| --- | --- | --- |
|  | Rock Salt | Sea Salt Crystals |
| Moisture | 0.34 | 7.60 |
| Insoluble matter | 0.01 | 0.50 |
| $CaSO_4$ | 1.69 | 1.33 |
| $MgCl_2$ | 0.16 | 0.78 |
| $CaCl_2$ | 0.18 | 0.06 |
| NaCl | 97.62 | 89.67 |

The impure raw salt starting material should comprise relatively small particles, the particles being of such size as to be capable of forming an aqueous slurry which can be pumped. Ordinarily, salt particles having a particle size less than 10 mesh, and preferably less than 50 mesh are employed.

These impure salt particles are then added to water of very high purity, such as distilled water, to form a slurry. Generally, such a slurry may comprise from about 10 to about 35 percent, by volume, of impure salt particles. Preferably, the slurry may comprise from about 25 to about 30 percent impure salt.

To enhance the processing of the slurry, it was found that the slurry preferably should be at a temperature not exceeding about 50° F., and preferably in the range between about 40° and about 50° F.

As stated hereinabove, the slurry of impure salt particles is subjected to violent shearing action. Such violent shearing action may be effected by well known emulsification equipment. This specialized equipment for the production of fine emulsions utilizes the principle of subjecting a liquid mixture to a vigorous or violent shearing action rather than to the impacting action often stressed in many processes for the size reduction of solids. Such equipment for the manufacture of emulsions suitable for providing the shearing action of the process of this invention includes colloid mills, homogenizers, and high speed impellers. The colloid mill subjects the slurry of impure salt particles to shearing action by passing the fluid between two surfaces that move at close clearance with respect to each other. In the homogenizer, this shearing action is usually attained by forcing the liquid under pressure through small orifices or between closely clearing, but relatively fixed surfaces. Recently, homogenizers have been developed for applying shearing action by other means, e.g. powerful vibrations from a diaphragm. High speed impellers provide shearing forces by liquid currents established by the action of the impeller. A more detailed description of several types of high shear equipment which may be used in the process of this invention is given below.

In colloid mills, the shearing action is generally accomplished by gravity feed of the slurry of impure salt particles to a narrow opening between two surfaces that move at high speed with respect to each other. In some mills this opening is adjustable, and in others it is fixed. The smallest openings generally are on the order of 0.001 in. Most mills have a rotor and a stator. The mills may differ in the character of the surfaces. Some are grooved and others are smooth.

Most conventional types of homogenizers function by passing the product under pressure between closely clearing, but relatively fixed surfaces. The high velocity, hydraulic shear, pressure release, and impact rend the dispersed phase into a very fine state of subdivision of the order of one micron in diameter (about $1/25,000$ in.).

Most of the machines function by pumping the fluid mixture under high pressure to a narrow opening between a valve plug and its seat, the size of the opening being controllable. For example, in the Cherry-Burrell viscolizer and in the Gaulin homogenizer, the fluid is actuated by a reciprocating pump comprising a series of multiple plungers operated by an eccentric driving shaft to force the liquid through the valve openings. The product develops a very high velocity as it passes through the extremely small opening. As a result of this velocity and of the frictional drag of material in actual contact with the surfaces of the valve plug and seat, marked internal shear develops within the product, tending to break down the particle size of the dispersed phase comprising impure salt particles. An explosive effect also occurs as the particles are released from the zone of high pressure to that of atmospheric pressure. The dispersion is then completed by impact of the outlet streams.

A more recent type of homogenizer is the sonic oscillator which consists of a stainless steel diaphragm which is vibrated, e.g. electromagnetically, at frequencies in the range between about 60 and 360 vibrations per second. A stainless steel cover plate is mounted over and close to the diaphragm, forming a chamber therewith. The salt slurry to be treated is introduced to this chamber at its outer edge, from which it flows radially across the diaphragm to the outlet opening in the center. In so doing it is subjected to the intense vibration of the diaphragm.

Various types of high speed impeller mixers are known. A typical laboratory size device is the Waring Blendor. These high speed impellers establish high velocity fluid currents and baffle surfaces which exert a shearing action on the slurry of impure salt particles.

The high shear action caused by the above type apparatus on the slurry of impure salt particles accomplishes two desirable results. The bonds which hold salt impurities in association with the crystals of sodium chloride are broken. Also the salt particles are reduced in size to colloidal size crystals of substantially pure sodium chloride. The particle size of such crystals ordinarily will be less than one micron, generally being 0.1 micron or less.

With such high shear equipment as homogenizers and colloid mills such particle size reduction and separation of associated impurities can ordinarily be effected by a single pass of the slurry of impure salt particles through the equipment. With high speed impeller mixers the slurry must remain in the equipment for a time sufficient to obtain the desired particle size reduction and impurity separation. The residence time will, of course, vary with the particular equipment used.

Regardless of the type of equipment used, a person skilled in the art can determine if the slurry of impure salt has been subjected to sufficient shearing action to obtain the advantageous results of this invention by examination of the resulting colloidal suspension, after removal of impurities as hereinafter discussed, and noting the presence or absence of the Tyndall effect, which should be absent, or under an ultramicroscope to determine the particle size of the purified salt crystals.

After the slurry has been subjected to shearing action, as hereinabove described, the impurities may be separated from the resulting colloidal salt suspension by gravity settling or by the use of equipment which exerts a force many times gravity on the particulate impurities, such as a centrifuge.

After removing the particulate impurities, as described, there is obtained a highly stable, colloidal suspension of substantially pure sodium chloride particles having a particle size less than about 1 micron. The solids content of this colloidal suspension will not vary greatly from that of the slurry of impure salt particles forming the raw material of the process of this invention inasmuch as the amount of impurities initially present in association with the raw salt particles is generally relatively small, usually not exceeding about 5 percent, by weight. Thus, for example, if the initial slurry of impure salt particles comprises 25 percent, by volume of salt particles, the product of this invention will contain about the same quantity of salt. Thus the novel aqueous colloidal suspensions of this invention ordinarily will comprise from about 10 to about 35 percent, by volume, of substantially pure salt particles, and preferably 25–30 percent.

If desired a dry salt product of improved hydroscopic properties may be obtained by crystallizing out the crystals of substantially pure salt by standard procedures, such as spray or drum drying.

The invention will be further described in connection with the following examples, but it will be understood that the invention is not limited thereto.

*Example I*

A slurry comprising 25 percent by volume of commercially available impure salt (NaCl) particles of −50 mesh size in distilled water at 45° F. was prepared and placed in a Waring Blendor. The impeller was run for a period of 20 minutes. The liquid was removed from the Waring Blendor and allowed to stand for about 24 hours in a beaker. The liquid portion was then decanted to separate it from the precipitate of impurities in the bottom of the beaker.

The decanted liquid comprised a highly stable colloidal suspension of sodium chloride particles having a particle size less than about 1 micron. The solids content of the colloidal suspension was slightly less than 25 percent by volume.

*Example II*

The colloidal suspension of salt particles prepared as in Example I above was heated to evaporate the water therefrom and there was obtained a substantially dry, fluffy, bulky mass of substantially pure sodium chloride crystals.

It will be understood that it is desired to comprehend within this invention such modifications as come within the scope of the claims and which are required to adapt it to various conditions and uses.

What is claimed is:

1. A method for purifying sodium chloride which comprises forcing an aqueous slurry of impure sodium chloride particles under pressure through a small orifice at high velocity and impacting the stream emerging from said orifice against a surface in a zone of reduced pressure to reduce the size of said particles to colloidal size and to separate therefrom associated impurities, and removing the separated impurities from the resulting colloidal suspension of substantially pure sodium chloride particles.

2. The method according to claim 1 in which said slurry comprises from about 10 to about 35 percent, by volume, of impure salt particles.

3. The method according to claim 2 in which said slurry is formed from distilled water and the temperature of said slurry is below about 50° F.

4. The method according to claim 1 in which the separated impurities are removed by gravity settling followed by decantation of the colloidal suspension of substantially pure sodium chloride particles.

5. The method according to claim 1 in which the separated impurities are removed from the colloidal suspension of substantially pure sodium chloride particles by centrifugation.

6. The method according to claim 1 in which the aqueous medium is evaporated from the resulting colloidal suspension of substantially pure sodium chloride particles to provide a dry, substantially pure sodium chloride product of improved hydroscopic properties.

7. A composition of matter particularly useful in seasoning foods consisting of colloidal size particles of substantially pure salt suspended in substantially pure aqueous medium, said composition comprising between about 10 and about 35 percent, by volume, of said particles.

References Cited in the file of this patent

UNITED STATES PATENTS

| | | |
|---|---|---|
| 2,613,133 | Anderson | Oct. 7, 1952 |
| 2,902,343 | Saccardo | Sept. 1, 1959 |